United States Patent [19]

Stemmle

[11] 4,029,411

[45] June 14, 1977

[54] VARIABLE MAGNIFICATION COPIER

[75] Inventor: Denis J. Stemmle, Williamson, N.Y.

[73] Assignee: Xerox Corporation, Stamford, Conn.

[22] Filed: Oct. 30, 1975

[21] Appl. No.: 627,434

[52] U.S. Cl. .................................... 355/51; 355/76

[51] Int. Cl.[2] .................... G03B 27/48; G03B 27/62

[58] Field of Search .................. 355/50, 51, 75, 76, 355/57, 66, 11, 16, 18, 55, 56, 60, 3 R

[56] References Cited

UNITED STATES PATENTS

| | | | |
|---|---|---|---|
| 3,521,950 | 7/1970 | Gardner et al. | 355/3 R |
| 3,703,334 | 11/1972 | Knechtel et al. | 355/57 X |
| 3,762,813 | 10/1973 | Fowlie et al. | 355/51 X |
| 3,778,147 | 12/1973 | Reehil et al. | 355/51 X |
| 3,792,926 | 2/1974 | Knechtel et al. | 355/11 X |
| 3,865,482 | 2/1975 | Bendall et al. | 355/3 R X |
| 3,891,315 | 6/1975 | Kolibas | 355/11 X |
| 3,901,593 | 8/1975 | Kogiso et al. | 355/11 |
| 3,985,438 | 10/1976 | Kurita | 355/11 |

FOREIGN PATENTS OR APPLICATIONS

| | | | |
|---|---|---|---|
| 478,061 | 10/1951 | Canada | 355/51 |
| 1,509,647 | 1968 | France | 355/76 |
| 1,523,642 | 1968 | France | 355/76 |
| 2,353,792 | 1973 | Germany | 355/76 |

OTHER PUBLICATIONS

IBM Tech. Disclosure Bull. vol. 6, No. 2, 1963.

*Primary Examiner*—Donald A. Griffin

[57] ABSTRACT

A copier providing selectively variable magnification copying of documents while the documents are moved uninterruptedly through a document imaging station on a document transport belt, and full-frame exposed by a flash illumination system, where one edge of each document is registered on the document transport, and the position within the document exposure station at which a document is copied is shifted in proportion to the selected magnification of the optical system by proportionally changing the initiation time of the illumination system. The optical system consists of a fixed mirror, a fixed focus movable lens, and a movable mirror all along a common optical axis, and the movable mirror and lens move in the same direction to change the magnification, shift the imaging position, and control the illumination system operation to compensate for the shift in imaging position.

4 Claims, 2 Drawing Figures

VARIABLE MAGNIFICATION COPIER

Figure 1:
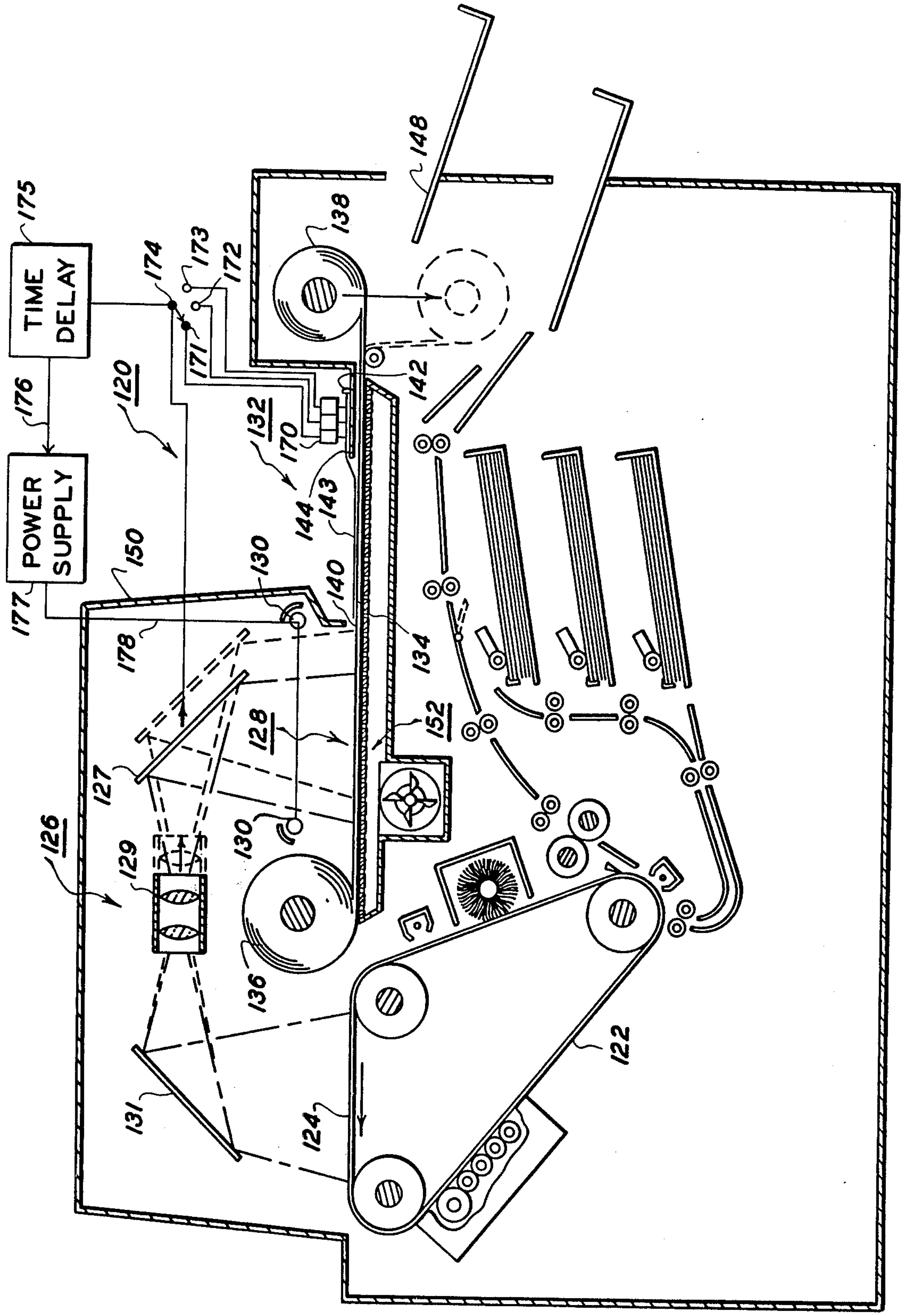

This application is related to a commonly assigned pending U.S. Patent application Ser. No. 560,755, filed Mar. 24, 1975, by the same Denis J. Stemmle entitled "Precollation Copying" [D/73515]. The disclosure thereof, and the prior art references cited therein are incorporated by reference in this application. The commissioner's notice of May 19, 1975, published June 17, 1975, is noted.

This invention relates to a reproducing apparatus including means for copying documents selectively at different magnifications.

A variety of electrostatographic reproducing machines with different modes of variable magnification operation are known. One type of machine utilizes a moving original exposure system wherein an original document is moved past a fixed slit optical system for projecting an image onto a moving photoconductive surface. Some of these machines include means for changing the magnification of the projected image and the speed of the moving original to provide reduction copies, Exemplary of patents in this area are U.S. Pat. Nos. 3,076,392 to Cerasani et al., and 3,649,114 to Vlach et al. Other types of machines have been adapted to copy stationary original documents at a variety of magnifications or reductions through the use of a scanning optical system with different scanning speeds. Exemplary of patents in this area are U.S. Pat. Nos. 3,476,478 to Rees, Jr.; 3,542,467 to Furgeson; 3,614,222 to Post; and 3,837,743 to Amemiya.

U.S. Pat. Nos. 3,687,544, issued Aug. 29, 1972, to R. Muller, and 3,792,926 issued Feb. 19, 1974, to W. J. Knechtel, et al, in class 355, are exemplary of copying systems in which a lens and mirror can be moved on the same axis parallel to stationary documents of different selected sizes to provide variable magnification full-frame imaging of the documents on a photocopying media. However, they teach moving these optical elements so as to maintain copying of the document at the same registration edge for the document irrespective of the changes in magnification thereof.

Another type of variable magnification copier, in which full frame flash exposure is made of a stationary original document, is shown for example in U.K. Pat. No. 1,336,819, published Nov. 14, 1973, by International Business Machines Corporation and U.S. Pat. No. 3,778,147, issued Dec. 11, 1973, to E. G. Reedhil et al. The latter reference discloses delaying the application of the flash energizing pulse in response to the selected magnification ratio.

Although not discussed herein, it will be appreciated that it is known to adjust the document illumination level in a variable magnification copier to compensate for the difference in its magnification. For example, the intensity or pulse length of a flash illuminator can be varied.

Reproducing apparatuses including the capability of making copies from both moving and stationary originals are also described, for example, in U.S. Pat. No. 3,833,296 to Vola, and in IBM Technical Disclosure Bulletin, Vol. 12, No. 1, at page 173, June 1969.

In the copier art it is known to register front or side edges of a document against guides or stops associated with a copying platen of a copier. It is also known to transport and register with a belt individual documents over a copying platen by reversing the belt motion sufficiently to drive the document's trailing edge against a registration stop, e.g., U.S. Pat. No. 3,506,257, to G. E. Falker et al., issued Apr. 14, 1970, (note Col. 7) and the Xerox "9200" duplicator. While such frictional document belt systems provide automatic document registration, they do not readily provide the degree of document safety of the present apparatus. With the system described herein the documents can be preregistered on the exposed surface of a belt prior to copying with full accessability to the document, rather than the document being registered over a platen underneath (covered by) a belt.

The present invention is particularly useful as a part of an improved reproduction system for producing precollated copy sets from sets of individual document sheets by recirculating the documents on a web on which they are stored as in the above-cited parent application of Denis J. Stemmle.

When multiple copies are made from a multi-page set of original documents, the multi-page copies thereof must be separated into separate copy sets in proper order, which is known as collation. For example, for ten copies of a five page document set the copies should end up in ten separate copy sets, each copy set having one copy of pages 1 through 5 therein, in that order.

In automatic pre-collation copying the original documents are initially loaded onto a transport system and are serially recirculated, and one copy made per page per recirculation, by the number of time corresponding to the number of copies desired. Thus, the copy sheets come out of the reproducing apparatus individually, but already pre-collated into order, i.e., in sets. Another term for a pre-collation system is a "document recirculation system", since the documents must be recirculated in some manner in order to allow their repeated sequential copying. Stating it another way, one copy at a time is made from the originals, one original page at a time, in forward or reverse page sequence, until the original document set has been fully copied. Then this copying sequence of the document set is repeated by the number of times corresponding to the desired number of copies of the document set. Thus, for the exemplary 10 copies of a 5 page book, one copy at a time would be made of each document page in this order: pages 1, 2, 3, 4, 5; 1, 2, 3, 4, 5, etc., repeated a total of ten time to make 10 copy sets. Alternatively, for bi-directional copying the copying sequence can be 1, 2, 3, 4, 5; 5, 4, 3, 2, 1; 1, 2, 3, 4, 5, etc..

A disadvantage of most previously known pre-collation copying systems, manual or automatic, is that they require more handling of the original documents than post-collation copying systems, since each document must be repeatedly moved in and out of a copying station, (such as on and off the platen of a xerographic copier) by the number of times equal to the number of copies desired. This repeated movement and handling of the documents is time consuming and may reduce the overall effective copying speed of the reproduction system. It may also result in damage to the document sheets. The risk of document damage increases in proportion to the number of document recirculations. Paper document sheets which are thinner than average, or irregular in size, or which have aged, or which have tears or curls or fastening means therein, are particularly susceptible to damage or destruction by repeated handling in conventional type document transport systems, where the document may be subjected to relative motion with respect to feed rollers, belts, wheels, gates or the like. Also, there may be a psychological resistance by an operator to placing a document inside a mechanism where it cannot be seen and is being operated on. Thus, manual document separation, movement and placement is preferable to the extent practical.

The above and other problems in multiple set document copying can be avoided by providing a pre-collation system as in the above-cited Stemmle application in which document recirculation for multiple serial copying is provided while retaining document sheets on an elongate web on which the documents are initially loaded. The web can be wound in document retaining storage scrolls for minimizing document handling and maximizing document protection, and the web can be wound and unwound between the document retaining scrolls for the multiple pre-collation document copying. The web can be repeatedly wound and unwound from one scroll to the other (recirculated) to repeatedly expose individual documents on the web in an exposed portion of the web extending between the scrolls. The documents can be optically exposed on the web between the scrolls for copying, and a simple optics arrangement may be utilized.

The documents in the system disclosed herein need not forceably contact any other object than the retaining web itself, and there need be no substantial relative motion required at any time between the document sheets and any other object during copying, including the web. This reduces the danger of document damage greatly.

In the disclosed system, the advantages of manual initial document placement can be provided. Yet once the documents are placed on the web, all of the subsequent recirculation of the documents for pre-collation copying may be accomplished by the system itself without manual intervention. Further, the unloading of the documents can also be automatically accomplished. Thus, all of the advantages of pre-collation copying can be provided, yet with a minimization of document handling disadvantages. Further, the present system is compatible with known automatic sheet separating or feeding systems, since only a single separating and loading operation need be performed on each document regardless of the number of copies.

Exemplary embodiments of the present invention are shown and described hereinbelow as incorporated into generally known exemplary xerographic apparatus and processes. Accordingly, said xerographic apparatus and processes themselves need not be described in detail herein, since various printed publications, patents and publicly used machines are available which teach details thereof to those skilled in the art, including those cited in the above-cited Stemmle application.

Figure 2:
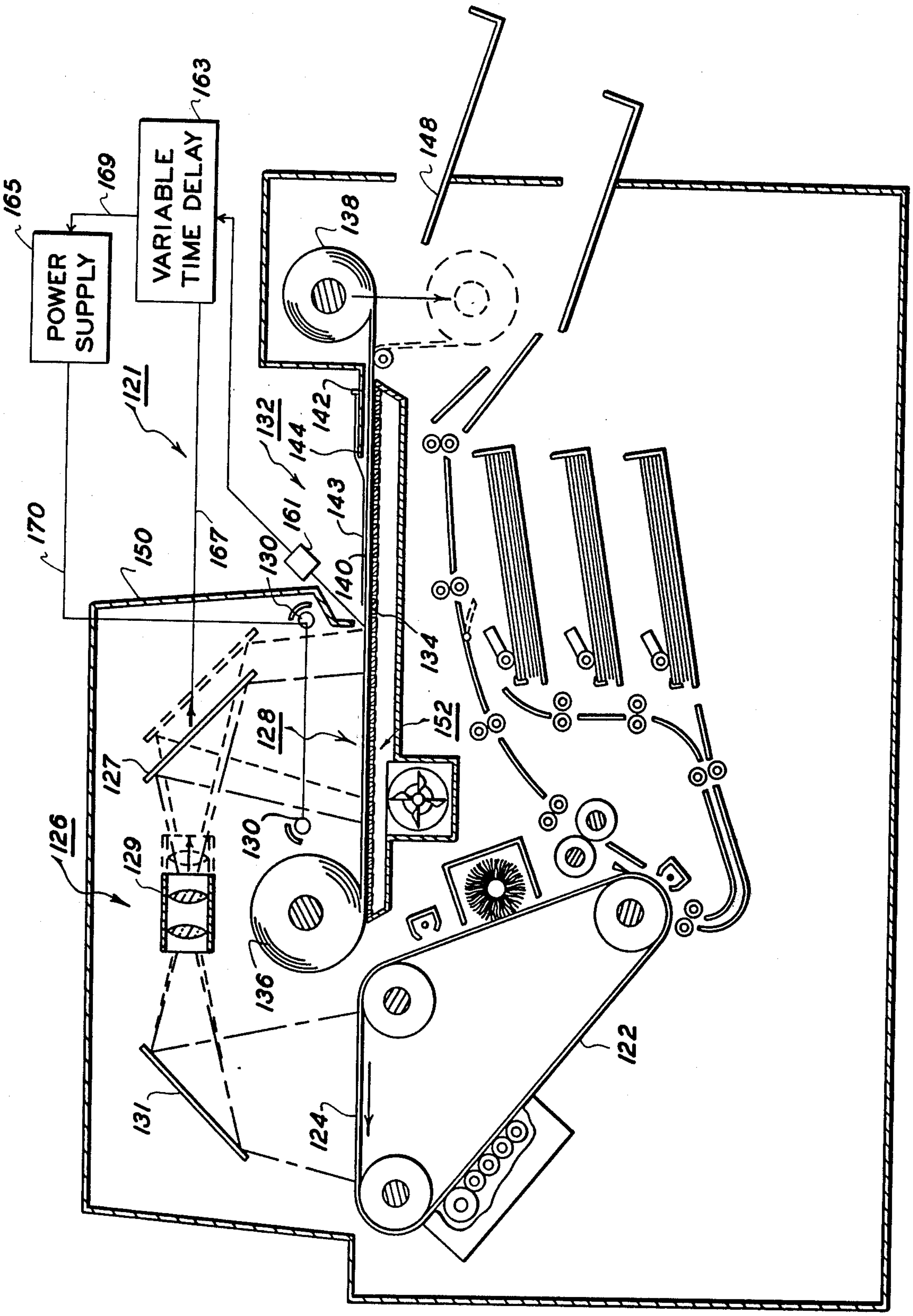

Further objects, features and advantages of the present invention pertain to the particular apparatus, steps, and details whereby the above-mentioned aspects of the invention are attained. Accordingly, the invention will be better understood by reference to the following description and to the schematic drawings forming a part thereof, wherein:

FIG. 1 is a schematic side view of an exemplary variable magnification xerographic copying apparatus in accordance with the present invention; and FIG. 2 is a similar view of a second embodiment.

Referring now to the drawings, FIG. 1 illustrates one embodiment 120 of the present invention, and FIG. 2, an alternative embodiment 121.

It will be appreciated that these are merely examples of the present invention. In other embodiments the document handling systems may have different orientations and different xerographic (or other electrostatographic) copying systems. In FIGS. 1 and 2 the copier unit itself is the same, and the same reference numbers and description apply to both.

In both the embodiments 120 and 121 of FIGS. 1 and 2, it may be seen that the documents are loaded upon, and automatically recirculated by, an elongate windable document holding web 134. Means are provided for forming a spaced pair of oppositely wound scrolls from this web for winding up the documents loaded onto the web into these scrolls. The documents are retained between the turns of the web on both of the scrolls during the copying operation. It may be seen that the web has a minor intermediate unwound segment 140 extending between the two web scrolls where the documents are exposed for copying by appropriate optical imaging means 126. The document imaging means projects the document images onto a xerographic imaging surface, here a photoreceptive belt 122. Appropriate or conventional drive means are provided for recirculatingly winding and unwinding the web between one web scroll and the other so as to recirculatingly expose, in sequence, the individual documents on the web as they appear on the unwound intermediate web segment. The documents are thereby exposed in the precollated order in which they are loaded onto the web, or/and the inverse. Thus, correspondingly pre-collated copy sets can be produced by the web recirculations between the scrolls. As the documents are loaded onto the web they are wound up on the web into one of the scrolls so that the documents are trapped between the web layers of the scroll. Likewise, when the web is recirculated onto the other scroll the documents may be retained in position solely by being held between the layers of the other scroll. The documents may each be exposed as the document set is being loaded onto the web to provide a "proof set".

In the intermediate web segment between the scrolls the documents are preferably held in position on the web by providing a web with an air permeable structure and by providing a vacuum platen and vacuum chamber on the opposite side of the web from the document retaining side. The porous web and the exposed document thereon are thereby held against the vacuum platen within the span region of the web between the scrolls. The retaining of the documents on the web in the exposed inner-scroll segment is also assisted by providing a substantially linear and planar configuration of the web between the two scrolls.

The scrolls illustrated in the Figures are oppositely wound and convoluted and allochiral. The intermediate segment of the web forms a document retaining nip on its document retaining side with each of the scrolls where the web winds into the scrolls, i.e., both of the nips are on the document retaining side of the web. Further, both of the scrolls are on the document retaining side of the web in their document recirculating position. This insures that the documents are maintained on the web on its document retaining side continuously, and that the documents are maintained only in a concave orientation on both of the scrolls (concave relative to the side of the documents being imaged).

Referring now in more detail to the document retaining web, it is preferably thin, flexible, but substantially non-stretching Mylar plastic or other suitable web material, highly perforated over at least its major central portion to render it air permeable. Its outer edges may be unperforated for the web to be frictionally driven by pinch rollers in the exposed intermediate area. The web or belt may also be covered by a thin layer of coating of high friction material. The document transporting and supporting side surface of the web provides a high friction surface relative to the documents to prevent substantial document movement or sliding on the surface of the web.

The xerographic processor of both FIGS. 1 and 2 here comprises a flexible photoreceptor belt 122 and associated components. This type of xerographic processor is disclosed in the Xerox Corporation "9200" high-speed xerographic duplicator and in patents thereon. Accordingly, its details need not be described herein.

The configuration of the photoconductive belt 122 provides a full frame planar imaging area 124 thereon. This allows the use of a simplified optics system 126 in which the entire document is imaged at once at an imaging station 128. Illumination is provided substantially instantaneously, so as to "stop" document movement, by a flash lamp illumination system 130. This full frame image is then reflected as shown through two large stationary mirrors and a lens onto the belt imaging area 124. Dashed outline positions of the two mirrors and the lens are shown to illustrate two exemplary alternative positions for variable reduction of the document's image size on the final copy sheet.

It is noted that no second or alternative optics path from a stationary platen document copying station is provided in this embodiment 120. However, it will be appreciated that one can be provided, and with a simple optics arrangement.

The document web 134 and the web scrolls 136 and 138 are shown here in their copying or document recirculating position. This is also their document loading position for these embodiments.

The exemplary document loading arrangement and operation for loading documents onto the intermediate segment 140 of the web 134 will now be described. An exemplary document 143 is shown in the loading position. It may be seen there is a document loading edge stop 142 substantially spaced from the imaging station 128 and the web 134. Also, there is a connecting document support surface 144 extending from the document edge stop 142 toward the web 134. A portion of the web intermediate segment 140 adjacent the support surface 144 provides a document loading and support area in combination therewith. The support surface 144 is closely spaced above and generally parallel the web 134 here, and both are horizontal and fully exposed. The document edge stop 142 provides registration of the rear edge of the document 143 being loaded onto the web 134, while the opposing for forward edge of the same document 143 is being simultaneously directly placed on the intermediate segment 140 of the web 134. The support surface 144 provides sufficient support of the rear portion of the document off of the web and is generally planar and smooth (low friction) to allow manual readjusting or correct positioning of the document as it is being loaded against the edge stop 142. The edge stop 142 extends linearly at right angles across the web 134. Thus, the documents may be fully manually registered and loaded on the web without any significant skew of the document relative to the direction of movement of the web.

The support surface 144 here is shown as supporting a relatively small portion of the maximum document dimensions capacity, which extends here almost to the imaging station 128. However, it will be appreciated that the support surface 144 may support a larger portion of the document and may also be mounted so as to be angled downwardly toward the web 134.

It may be seen that, in contrast to forward or lead edge document registration systems, the document lead edge here is not fed into any stop fingers. The web movement during loading will pull the document away from the edge stop 142 rather than drive the document against it. The edge stop 142 may be a simple fixed surface of lip upstanding relative to and integral the support surface 144. It does not need to be retractable or movable in any manner.

As soon as the operator releases his hand from the document 143 and causes the web to advance, the vacuum and gravity attraction to the web 134 of that portion of the document which is resting on the web (rather than on the support surface 144) will carry the document off on the web 134 directly into the imaging station 128, with the trailing portion of the document sliding off of the support surface 144 onto the web and away from the edge stop 142.

The document edge stop and the support surface 144 are spaced away sufficiently from the web 134 so that they do not interact in any way with the web or documents thereon once the documents are loaded. Thus, high speed recirculating copying by web movement between the two scrolls 136 and 138 may be accomplished without any mechanical contact with the document whatsoever.

The edge position of the document may be registered or known by the machine logic relative to the web position if the web is stopped during each document loading. The document position on the web is then known for registration purposes by the machine logic for its subsequent recirculating copying at the imaging station 128.

The above-described document loading system provides for initial "trailing edge" registration. However, a "leading edge" registration system, using sensors or retractable stop fingers, could also be utilized with the present invention.

Various automatic document unloading arrangements for documents on the web 134 may be provided. Illustrated here is an unloading arrangement wherein the scroll 138 has moved downwardly to arcuately loop web 134 around a supporting roller to provide automatic stripping of documents into a document catch tray 148 upon the winding up of the web 134 into the scroll 138.

Referring now to the imaging of documents which have been loaded onto the web 134, it may be seen with the arrangements shown that a light shield 150 is provided to enclose the imaging station 128 and the illumination from the flash lamps 130 within the apparatus 120. The document edge stop 142 is outside of and substantially spaced from the light shield 150 so that the entire document loading area is in full view and freely accessible by the operator. Yet the web 134 passes immediately from this document loading area into the imaging station 128 under the edge of the light shield 150, which extends toward, but is closely spaced from, the intermediate segment 140 of the web. An immediate "proof set" copy can be initiated as each document is loaded. In effect, the light shield 150 divides the web intermediate segment 140 into two portions, one of which is outside the light shield for document loading (with light shielding) and the other of which is within the light shield for imaging of the documents. Both of these portions of the intermediate segment 140 are in the same plane and utilize the same or similar vacuum system 152 applying a vacuum therethrough. The entire intermediate segment 140 has a desirable horizontal and upwardly facing orientation.

Another advantage of the xenon flash lamp 130 simultaneous imaging of the full document is that this type of illumination effectively optically "stops" the image like a high-speed camera even though the document may be moving quite rapidly on the web 134. Thus, if desired, the web 134 during copying may be continuously moved between the scrolls in either direction, i.e., the documents may be copied as they pass through the imaging station 128 from either direction. There is no problem with maintaining proper scanning direction and speed coordination with the photoreceptor belt 122, unlike the slit scanning or "flowing light image" systems of other embodiments, which require smooth precise web driving accurately synchronized with the photoreceptor surface movement. However, is such bi-directional document scanning is utilized here, an inverter is needed to invert each page of alternate copy sets. While flash lamps are preferred, it will be appreciated that full frame "flash" illumination can also be provided in effect by the use of a high intensity illumination and a shutter, particularly if the document and photoreceptor velocities are synchronized.

Referring now specifically to FIG. 1, and to the specific embodiment of the present invention disclosed therein, it will be seen that the document illumination system 130 is variably controlled by the document registration system, and more particularly by a document sensor arrangement in coordination with the variable magnification setting of the optics system. There is shown here schematically a document trail edge registration system comprising a plurality of closely spaced document trail edge sensors 170. These may be conventional mechanical, pneumatic, or electro-optical coupling devices which provide an electrical output signal upon the passage of the trail edge of the document past the particular sensor. There is shown here by way of example, three such sensors with electrical output leads 171, 172, and 173 connected to three discrete selectable contacts of a switch 174. The switch position of switch 174 between thses three inputs is controlled directly by the variable magnification setting of the optics system 126.

This selected output of the switch 174 is then connected to a time delay circuit 175 to initiate here a preset or fixed time delay. It will be appreciated that the time delay circuit 175 can be any of a variety of suitable conventional circuits such as RC timers, digital clock timers, etc. The output lead 176 from the time delay provides a pulse or control signal output after the time delay to the power supply 177 which powers the xenon flash lamps 130 of the document illumination system through a power supply output lead 178. The power supply 177 can be a conventional xenon flash lamp power supply which provides a suitable high voltage and high power discharge substantially instantaneously upon the application of an input pulse or input lead 176 triggering the power supply 177.

The variable magnification optical imaging means 126 here consists of (in sequence along a single optical axis) a movable mirror 127, a fixed focus movable lens unit 129, and a fixed mirror 131. The full frame image of the document at the document imaging station 128 is illuminated substantially instantaneously by the flash lamps 130 and the full document image is reflected by the movable mirror 127 through the lens 129 to the fixed mirror 131 and then down on to the photoreceptor 122. None of these parts move during the copying operation. However, to change the magnification of the document, prior to its being copied, the movable mirror 127 and the lens 129 are both moved in the same direction, along a common axis parallel the document path, as illustrated here by the movement arrows between the two illustrated alternative positions of these components, with two illustrated corresponding fields of view of their document copying area. It may be seen that a change in magnification with this system automatically shifts the position within the document exposure station 128 at which a document is copied. Both the leading and trailing edges of this exposure area are moved when the magnification is changed. I.e., both the leading and trailing edge document positions for copying are shifted with the shift in magnification, unlike the prior art systems noted in the introduction here in which one registration edge is always maintained in the same position. Here the registration edge of the document is shifted in direct proportion to its selected magnification by the optical imaging system.

The above optical arrangement whereby the registration position of the document is shifted with variable magnification is allowed by the inner-connection of the document registration system, the variable magnification system, and the illumination system here. The movement of one or both of the movable optics elements (mirror 127 and lens 129) is connected, directly or indirectly, to change the position of the switch 174 here. Thus, when the magnification level is shifted, a different document trail edge sensor output 171, 172, or 173 is selected corresponding to that level of magnification.

These document sensors 170 are spaced along the direction of movement of the document on the document transport so that the selection of one sensor rather than another causes a corresponding shift in the relative time and position at which that particular sensor provides an output signal to the time delay circuit 175. This causes a corresponding shift in the actuation time of the time delay 175 and therefor an equal shift or delay in the output time of its output signal at lead 176 triggering the power supply 177. That in turn correspondingly shifts or delays the actuation time of the illumination lamps 130. Thus, it may be seen that the (substantially instantaneous) initiation of the flash illumination system is varied relative to the document movement in direct response to the selected magnification of the optical imaging system by its control of the document registration edge detecting position in this embodiment. It will be appreciated that lead edge sensing could be utilized with the same system here by moving the sensors and correspondingly changing the fixed time delay in time delay circuit 175.

The time delay of the time delay circuit 175 is coordinated with the velocity of movement of the document transport system (which is preferably running interruptedly at a constant speed during copying here), so that this time delay exactly equals the time required to move the document on the transport from its registration position (where the registration edge passes its sensor) upstream of the imaging area to the document imaging area of the optics system. This imaging area, as described above, changes with changes in the image magnification. This change in the document registration edge imaging position is compensated for here by an equal change in the initial document registration portion by a change in the selected sensor, since the sensor positions are correspondingly spaced.

It will be appreciated that with the system described here of FIG. 1, with a fixed time delay circuit 175, that the number of variable magnification settings for the copier will be limited by the number of sensors 170 provided. However, by introducing other selectable time delay circuitry for providing intermediate or other time delays into the circuit 175, rather than using a single fixed time delay, additional variable magnification positions can be provided for this system without requiring and corresponding increase in the number of sensors. This will be better understood with reference to the description below of the circuitry of FIG. 2 utilizing a single sensor.

With either the system of FIG. 1 or 2, the imaging position of the document within the exposure station is selected by triggering the illumination system to provide a substantially instantaneously exposure of the whole document at the point in time at which the selected registration edge of the document is underlying the corresponding desired edge of the imaging area of the optics system. Thus, the document does not have to be stopped at any time during the copying and a continuous sequence of documents may be copied uninterruptedly.

While the document 143 illustrated here is in the initial loading condition, it will be appreciated that in the normal copying cycle, once the initial loading of the documents is completed, that the documents will be all on the moving web itself. Thus, the trail edge document sensors 170 of FIG. 1 then will be sensing the passage of the trail edge of each document as it moves thereunder while being transported on the web. This can be readily accomplished here, by, for example, locating the sensors 170 here over an aperture or apertures in the loading plate 144 so that this loading area does not obstruct sensing of the documents on the web.

Referring now to FIG. 2, there is illustrated therein a second and alternative embodiment 121 of the present invention. The basic system and principle of operation is generally similar, so that the following description will be confined to the important distinctions therebetween. It may be seen that the document registration system here comprises a single lead edge document sensor 161 for sensing the passage of the lead edge of the document being carried on the transport web past a fixed sensor position. The document sensor 161 detects the passage of the lead edge of a document entering the exposure station 128, but is positioned outside of the exposure station. Therefore, it does not provide any interference with imaging. The output of the document sensor 161 initiates or starts a variable time delay circuit 163 of suitable conventional construction. The variably time delayed output of this circuit 163 appears at an output lead 169 which provides a trigger signal for a power supply 165. The power supply 165 connects through an output lead 170 to operate the flash lamp illumination system 130.

A primary difference in the embodiment 121 of FIG. 2 is that the movement of the optics system 126 corresponding to a change in magnification thereof is coupled through a suitable connection 167 (such as a potentiometer multi-position switch, shaft encoder, or the like) to the variable time delay 163 to control its variation in time delay, for example, by varying the resistance or capacitance of an RC time delay circuit.

It may be seen that the end result of the above-described arrangement is similar to the embodiment of FIG. 1 in that the movement of the optical elements to cause a change in magnification directly varies the time of initiation of the flash illumination system 130. However, in this case it does so by varying the time delay between the document registration sensing by a single document sensor rather than by switching between multiple document registration devices.

It may be seen that there have been disclosed herein embodiments of an improved variable magnification copying system. It will be appreciated that various modifications and improvements may be made therein by those skilled in the art. The following claims are intended to encompass all such modifications and improvements as fall within the spirit and scope of the invention.

What is claimed is:

1. In a copier wherein documents are copied by optical imaging means providing selectively variable magnification copying of the documents onto a position on an imaging surface while said documents are moving along a path through a document imaging station transported by document transport means, where the documents have leading and trailing edges relative to said document transport means, and wherein said documents are illuminated for said optical imaging means by illumination means comprising a substantially instantaneous flash illumination system, and wherein the entire area of a document to be copied by said optical imaging means is simultaneously illuminated by said flash illumination system while the document is moving through said document imaging station, the improvement comprising:

document registration means outside of said document imaging station for registering one said edge of a document on said document transport means as a registration edge, imaging position shifting means for automatically shifting the copying position within said document exposure station at which the moving registered document is copied in proportion to the selected magnification of said optical imaging means, including shifting the copying positions of both said leading and trailing edges of the document, wherein said image position shifting means includes time delay means connecting between said document registration means and said flash illumination system and controlled by the selected magnification of said optical imaging means for varying the time of initiation of said flash illumination system relative to said moving registered document position in said document imaging station in response to the selected magnification of said optical imaging means and to said document registration means, and wherein said image position shifting means includes means for maintaining stationary the position of the imaging surface onto which the document is copied when said copying position within said document exposure station is shifted.

2. The copier of claim 1, wherein said means for maintaining stationary the position on the imaging surface onto which the document is copied comprises image reflective surface means in said optical imaging means movable parallel to said movement path of said documents through said document imaging station in response to the selected variable magnification of said optical imaging means.

3. The copier of claim 1, wherein said optical imaging means comprises a fixed mirror and a fixed focus movable lens and a movable mirror all along a common optical axis; and wherein said movable mirror and said lens are movable in the same direction parallel said movement path of said documents in said document imaging station to provide said variable magnification, and wherein said movable mirror and said lens are connected to control by their movement said time delay means for varying the time of initiation of said flash illumination system.

4. The copier of claim 1, wherein said document transport means operates continuously at a constant speed during said copying.

* * * * *